United States Patent [19]

Smigerski et al.

[11] 4,417,983
[45] Nov. 29, 1983

[54] SCRAPER APPARATUS FOR SETTLING BASINS AND THE LIKE

[75] Inventors: Rudolf Smigerski, Aarbergen; Rosemarie Dörner, Heidenrod; Peter Schmidt, Hohenstein-Holzhausen, all of Fed. Rep. of Germany

[73] Assignee: Passavant-Werke AG & Co. KG, Fed. Rep. of Germany

[21] Appl. No.: 245,731

[22] Filed: Mar. 20, 1981

[30] Foreign Application Priority Data

Mar. 26, 1980 [DE] Fed. Rep. of Germany ....... 3011752

[51] Int. Cl.³ .............................................. B01D 21/04
[52] U.S. Cl. ..................................... 210/527; 210/531
[58] Field of Search .......................... 210/527, 528–531

[56] References Cited

U.S. PATENT DOCUMENTS 2,006,825 7/1935 Downes .............................. 210/527

Primary Examiner—Thomas G. Wyse
Attorney, Agent, or Firm—Woodford R. Thompson, Jr.

[57] ABSTRACT

Scraper apparatus for settling basins embodies a translatable bridge which is mounted above the basin and carries a pivot arm and a loading device that generates a return force for loading a scraper blade carried by the pivot arm into the scraping position. The loading device generates a return force which initially increases during upward pivotal movement of the scraper blade.

6 Claims, 3 Drawing Figures

SCRAPER APPARATUS FOR SETTLING BASINS AND THE LIKE

BACKGROUND OF THE INVENTION

This invention relates to scraper apparatus for settling basins, such as sludge traps and the like having a bridge transportable above the basin, a scraper blade mounted for upward pivotal movement thereon by a pivot arm and a loading device which generates a return force that moves the scraper blade toward the scraping position.

Scraper apparatus of the above mentioned type is disclosed in German patent No. 1 179 160. The scraper disclosed in this patent has a pivot arm which extends vertically. This is particularly advantageous, where longitudinal scrapers are employed because the scraper blade can then actually be transported up to the end of the basin, which is not possible with scraper blades, which are trailed from the bridge at an angle. However, with the pivot arm in this vertical position, the return moment generated by the deadweight of the scraper blade is substantially zero, so that the scraper blade does not exert an adequate scraping force and would escape rearwardly by a small scraping resistance. It is for this reason that a loading device is provided which ensures the exertion of an adequate return force and scraping force even in the vertical position of the scraper blade. In prior art apparatus the loading device embodies a loading weight mounted pivotally on a lever arm on the bridge, with the bridge being connected to the pivot arm of the scraper blade through the intermediary of a knee lever which is bent during upward pivotal movement of the scraper blade and is extended or spread during the descent of the scraper blade. This arrangement has the advantage in that during the upward pivotal movement of the scraper blade the stroke distance of the loading weight is considerably shorter than that of the scraper blade.

A disadvantage of such prior art apparatus is that the return force exerted by the loading device decreases greatly even at the beginning of the pivotal movement of the scraper blade. If the scraper blade is forced by a thick and compact accumulation of sludge to escape or move out of the vertical position against the maximum return force exerted by the loading device, then the return force of the loading device decreases so rapidly that the scraper blade is even incapable of scraping away only the top layer of the sludge accumulation. This is true even though the pivot arm and scraper blade, in escaping or moving rearwardly, generate a return force by their deadweight which acts on a lever arm. That is, such force is far from being sufficient to compensate for the reduction in the return force of the loading device.

SUMMARY OF THE INVENTION

The primary object of the present invention is to provide scraper apparatus of compact construction which is suitable for use even in constricted space conditions and which is particularly adapted for layer by layer clearance of sludge accumulations.

In accordance with our invention we achieve the above object by providing scraper apparatus of the above mentioned type having a loading device which generates a return force that increases during the initial upward pivoting of the scraper blade. By this means an advantage is achieved in that, when the scraper blade encounters a thick and/or compact sludge accumulation, it does in fact initially bring about an escaping pivotal movement in an upward direction, but only until the return force of the loading device, which then increases, has become sufficiently great for the scraper blade to be capable, while in the escaping pivotal position, of clearing at least a top layer of the sludge accumulation of adequate thickness. All of the sludge is then cleared during repeated passages over the sludge accumulation. Where pivotal travel exceeds such escaping movements, the return force can then remain the same, or preferably decrease again in order to relieve the upward pivoting drive.

The loading device is preferably constructed so that its return force increases over an initial pivotal travel of the scraper blade, which according to the invention is approximately 20° to 45° and preferably approximately 30° whereupon the return force then decreases.

The construction of a loading device with the desired return characteristics may be effected in various ways. Preferably, the loading device consists of a loading weight carried by a supporting lever arm which is rigidly attached to a pivot arm for the scraper blade with the loading weight being arranged lower than the pivot axis of the scraper blade while the scraper blade is in the scraping position. When the scraper blade escapes and pivots upwardly, the force of the lever arm which affects the return moment exerted by the weight increases initially with reference to the pivot axis until the center of gravity of the loading weight is at the same elevation as the pivot axis, and thereafter the force decreases.

According to a further preferred embodiment of our invention, the upper portion of the pivot arm for the scraper blade has a forwardly angled configuration as viewed in the scraping direction of travel of the bridge. By this construction a complete upward pivoting of the scraper blade into a position above the basin crest is possible without the pivot arm striking the bridge. The loading weight and the length of the supporting lever arm connected to the pivot arm are preferably dimensioned so that the loading weight is located within the contours of the bridge even in the upper pivoted position.

DESCRIPTION OF THE DRAWINGS

Apparatus embodying features of our invention is explained more fully with reference to the accompanying drawings, in which.

DETAILED DESCRIPTION

Figure 1:
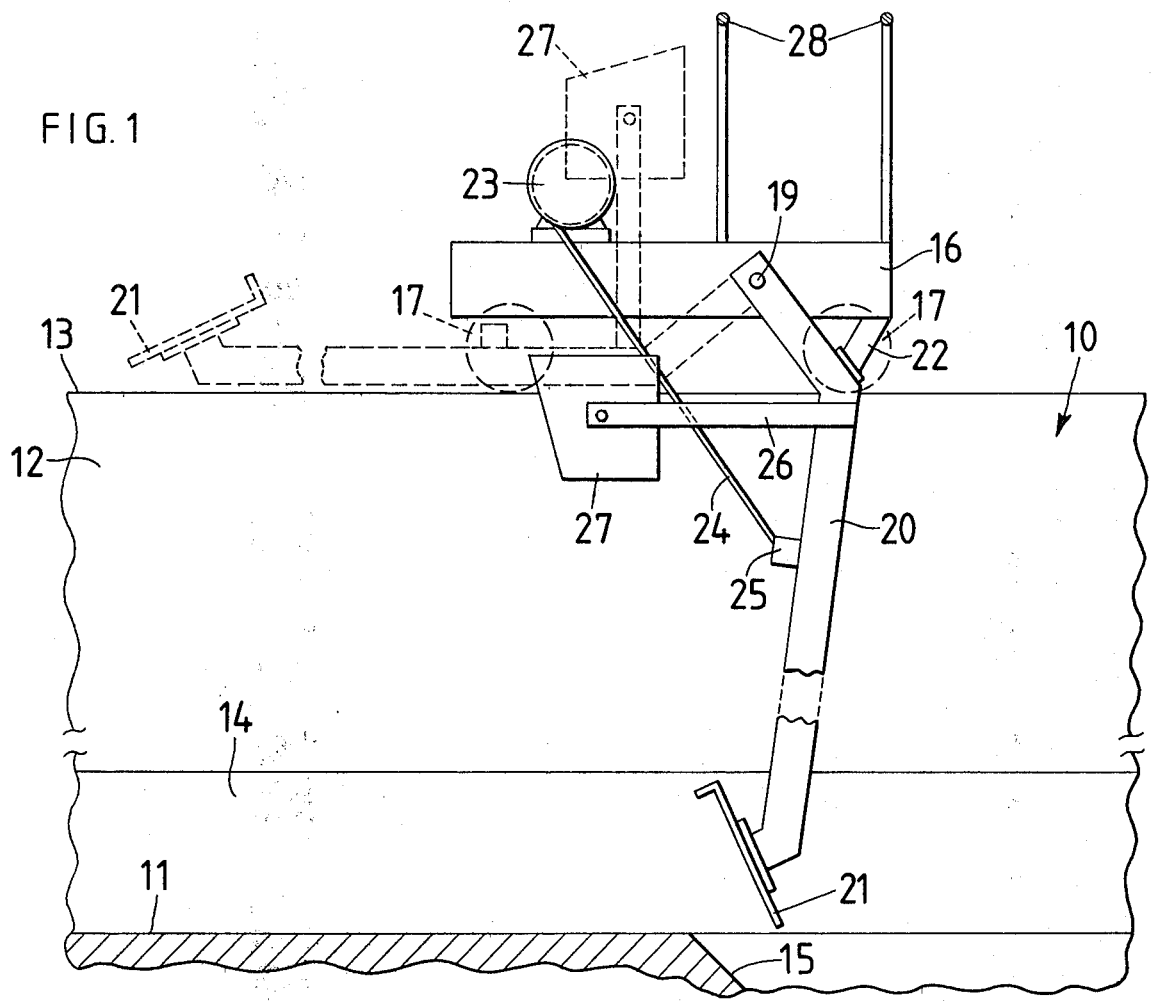
FIG. 1 is a side elevational view showing schematically scraper apparatus constructed in accordance with our invention and mounted in the sludge channel of a grit trap.
Figure 2:
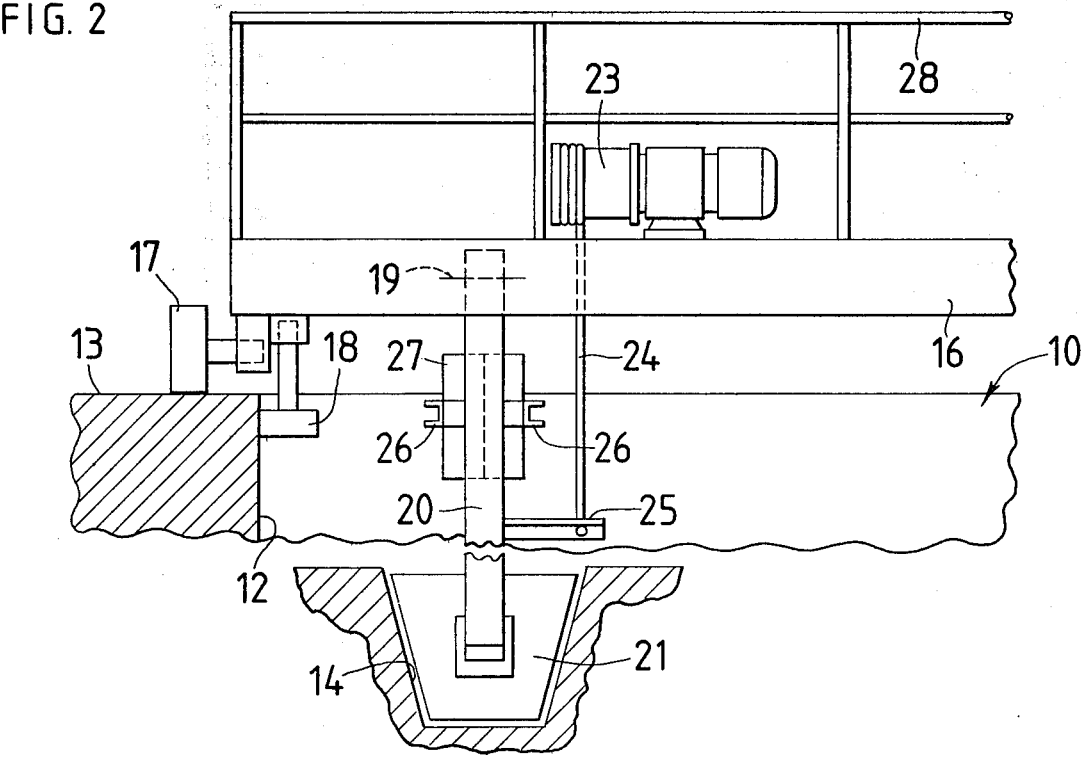
FIG. 2 is a fragmental, end elevational view of the apparatus shown in FIG. 1.

Referring now to the drawings, we show a grit trap basin 10 having a basin bottom 11, side walls 12 with a basin crest 13, and a sludge channel 14 which discharges into a sludge hopper 15. A translatable bridge 16 is mounted for movement on the basin crest 13 by means of wheels 17 and lateral guide rollers 18, as shown in FIG. 2. Mounted for pivotal movement about a horizontal pivot axis 19 on the bridge 16 is a pivot arm 20 which carries at its lower end a trapezoidal-shaped scraper blade 21. In the lower or scraping position, the front edge of the scraper blade 21 is located substantially vertically beneath the pivot axis 19, as shown in FIG. 1. This scraping position is determined by a stop 22 mounted on the bridge 16 against which the scraper arm 20 abuts. During the scraping travel of the bridge 16, which is directed from left to right in FIG. 1, the scraper blade 21 is in the scraping position whereby it clears the sludge out of the channel 14 and discharges it into the sludge hopper 15.

A motor driven cable winch 23 carries a hoisting cable 24, which is anchored to the pivot arm 20 as at 25 and serves to pivot the pivot arm 20 and the scraper blade 21 carried thereby in an upward direction. By actuating the motor of the cable winch 23 the scraper blade 21 can be pivoted upwardly to a position which is located above the basin crest 13, so that the scraper blade 21 is freely accessible for inspection and maintenance. As shown in FIG. 1, the pivot arm 20 has a configuration which is angled forwardly as viewed in the direction of travel of the bridge 16. This angled configuration makes it possible to pivot the scraper blade 21 upwardly above the basin crest 13 without the upper portion of the pivot arm 20 coming into contact with parts of the bridge 16, as would be the case with a straight configuration of the pivot arm 20.

Connected rigidly to the pivot arm 20 are two parallel support arms 26, which carry at their ends a loading weight 27 which may be in the form of a plurality of discs, so that the amount of the weight can be modified by varying the number of the discs employed. The length of the support arm 26 is dimensioned so that the distance of the center of gravity of the loading weight 27 from the pivot axis 19 is sufficient to generate a torque of sufficient value to urge the scraper blade 21 into its scraping position, so that the scraper blade 21 can exert the necessary scraping force while in the scraping position. Preferably, the loading weight 27 is located totally above the liquid level in the basin while in its lowest position.

The center of gravity of the loading weight 27 is located beneath the horizontal plane extending through the pivot axis 19. When the scraper blade 21 encounters a major accumulation of sludge and escapes by pivoting upwardly in a clockwise direction, as viewed in FIG. 1, the distance of the center of gravity of the loading weight 27 from the vertical plane extending through the pivot axis 19 also increases, so that the torque loading the scraper blade 21 likewise increases. In like manner, the distance of the center of gravity of the pivot arm 20 and scraper blade 21 carried thereby from a vertical plane passing through the pivot axis 19 also increases. The arrangement is preferably made so that the center of gravity of the loading weight 27 is located at the same height as the pivot axis 19 when the pivot arm 20 with the scraper blade 21 has been pivoted through an angular distance of approximately 30° out of the scraping position. The scraping force therefore increases during the first 30° of the pivoting movement of the scraper blade 21 and only then decreases. With a scraping force intensified in conformity with the pivoting of the loading weight 27, the scraper blade 21 is capable of penetrating a confronted sludge accumulation, the top layer of which could not be cleared by the loading force generated by the loading weight 27 in the scraping position.

After the first 25° or 30° of angular pivotal movement of the scraper blade 21, the distance of the center of gravity of the loading weight 27 from the vertical plane passing through the pivot axis 19 decreases greatly again even though the center of gravity of the pivot arm 20 is initially still increasing. Accordingly, the required force exerted by the cable winch 23 to impart upward pivotal movement of the scraper blade 21, is also reduced.

As may be seen from FIG. 1, the arrangement of the loading weight 27 and the length of its support arm 26 is co-ordinated so that the loading weight is still located totally within the contours of the bridge 16 and of the handrail 28 mounted thereon in the upwardly pivoted position, shown by dotted lines. The provision of protective grilles or masking elements for the loading weight 27 in the upwardly pivoted position are therefore not necessary, as would be the case if the loading weight were to project beyond the bridge chassis or the handrail.

Variations of the embodiment illustrated in the drawings are possible within the scope of our invention, for example, a support arm 26 need not necessarily be provided for attaching the loading weight. That is, the pivot arm 20 for the scraper blade 21 may be cranked or angled in such a way that it provides a part located at a sufficient distance behind the vertical plane passing through the pivot axis 19, to which the loading weight 27 can be directly attached. It is also possible to use an angled integral arm, to which the scraper blade on the one hand and the loading weight on the other hand are attached, and which is connected to the pivot axis 19 by a support arm standing outwardly therefrom. The invention can also be applied with the same advantages to scrapers having a pivot arm which is trailed at a more or less large angle.

Figure 3:
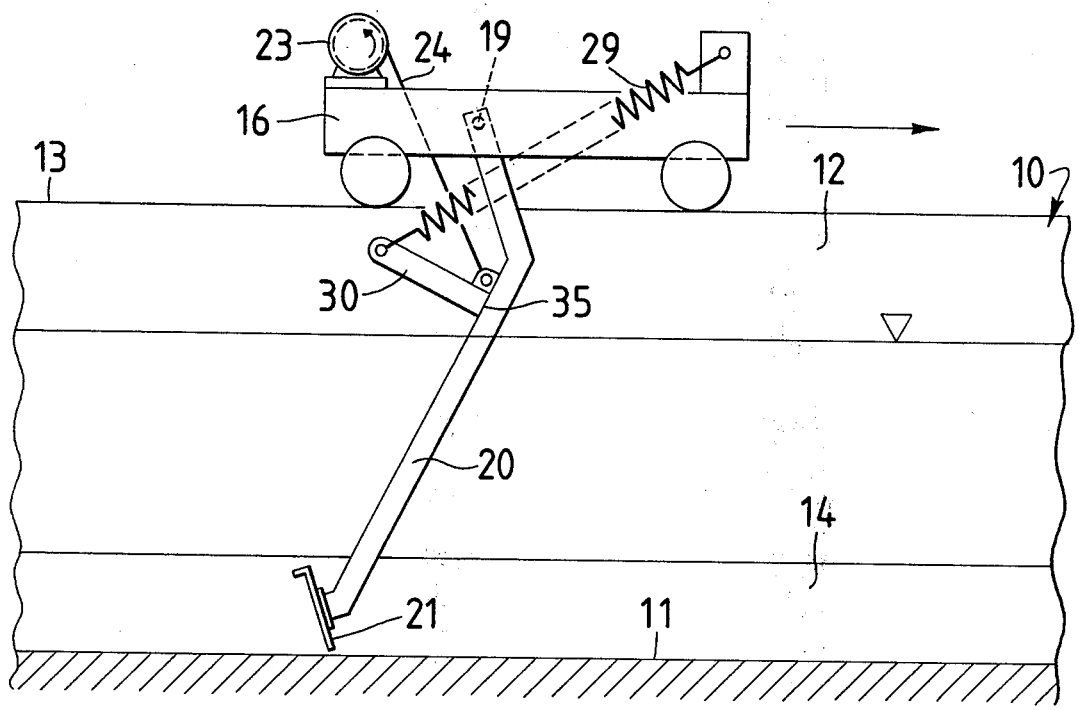
FIG. 3 is a schematic view showing another form of our scraper apparatus wherein a spring loading device is employed.

Another embodiment of the scraper device is shown in FIG. 3, wherein the pivot arm 20 is provided with a spring loading device instead of with a loading weight. For this purpose there is secured rigidly to the pivot arm 20, as at the point 35, an arm 30 to the end of which one end of a tension spring 29 is hooked. The other end of spring 29 is hooked to the bridge 16. When the pivot arm 20 rotates clockwise as viewed in FIG. 3 about its pivot axis 19, the length of the tension spring 29 increases initially until its longitudinal axis intersects the pivot axis 19 whereupon it then decreases. With this embodiment the return characteristic is such that the loading moment acting upon the scraper blade 21 increases up to the maximum escape angle and then decreases again. During upward pivotal movement of the pivot arm 20 the loading force actually disappears above the spring extension position and is transformed into a weight-reducing force. It will be noted that the maximum spring force must not quite attain the pivoting weight acting at dead center, because otherwise the pivot arm 20 could not be lowered automatically be means of the cable 24.

While we have shown our invention in several forms, it will be obvious to those skilled in the art that it is not so limited, but is susceptible of various other changes and modifications without departing from the spirit thereof.

What we claim is:

1. Scraper apparatus for settling basins and the like comprising a bridge transportable above the basin, a pivot arm pivotally connected adjacent one end to said bridge with a scraper blade mounted at the other end thereof for upward and rearward pivotal movement within said basin, and loading means operatively connected to said pivot arm for generating a return force which increases during the initial upward and rearward pivoting of the scraper blade an angular distance of approximately 20° to 45° to load the scraper blade into the scraping position and then decreases.

2. Scraper apparatus as defined in claim 1 in which the loading means is constructed and arranged so that its return force increases over an initial pivoting travel of the scraper blade an angular distance of approximately 30° and then decreases.

3. Scraper apparatus for settling basins and the like comprising a bridge transportable above the basin, a pivot arm pivotally connected adjacent one end to said bridge with a scraper blade mounted at the other end thereof for upward and rearward pivotal movement within said basin, a lever arm rigidly attached to said pivot arm which carries said scraper blade, a loading weight carried by said lever arm and arranged lower than the pivot axis of said pivot arm when the scraper blade is in the scraping position.

4. Scraper apparatus as defined in claim 3 in which the pivot axis of the pivot arm is located above the liquid level and above the crest of the basin.

5. Scraper apparatus as defined in claim 4 in which the pivot arm carrying the scraper blade and the loading weight is constructed and arranged so that it is located totally above the crest of the basin while in the upwardly pivoted position.

6. Scraper apparatus as defined in claim 3 in which the loading weight is also located totally above the liquid level in its lowest position.

* * * * *